(12) United States Patent
Spitler et al.

(10) Patent No.: US 8,210,592 B2
(45) Date of Patent: Jul. 3, 2012

(54) CONSOLE STORAGE RETENTION STRUCTURE

(75) Inventors: Nicholas Spitler, New Hudson, MI (US); Nobutaka Takeuchi, Saitama (JP)

(73) Assignee: Nissan North America, Inc., Franklin, TN (US)

( * ) Notice: Subject to any disclaimer, the term of this patent is extended or adjusted under 35 U.S.C. 154(b) by 335 days.

(21) Appl. No.: 12/718,334

(22) Filed: Mar. 5, 2010

(65) Prior Publication Data
US 2011/0215605 A1 Sep. 8, 2011

(51) Int. Cl.
*B60R 7/04* (2006.01)
(52) U.S. Cl. .................... 296/37.8; 296/24.34
(58) Field of Classification Search ............... 296/37.8, 296/24.34, 37.15; 224/275, 539, 926; 220/212, 220/811, 812
See application file for complete search history.

(56) References Cited

U.S. PATENT DOCUMENTS

| | | | |
|---|---|---|---|
| 2,934,391 A | 4/1960 | Bohnett | |
| 4,986,589 A | 1/1991 | McNew | |
| 2005/0035618 A1 | 2/2005 | Toth et al. | |
| 2007/0182184 A1 | 8/2007 | Lota | |
| 2008/0315606 A1* | 12/2008 | Sturt et al. | 296/24.34 |

* cited by examiner

*Primary Examiner* — Stephen Gordon
(74) *Attorney, Agent, or Firm* — Young Basile Hanlon & McFarlane, P.C.

(57) ABSTRACT

A console for use in a vehicle includes a compartment that is defined by a first wall and a second wall that are spaced apart from one another in a first direction. A first channel is disposed adjacent to the first wall and defines an opening that is oriented in an upward direction. First and second pairs of laterally spaced-apart retainer structures are disposed within the first channel. A tray member has a first pair of spaced-apart engagement structures that are configured to be received within the first channel and are configured to engage the retainer structures. The tray member is positionable within the compartment in a first position and a second position. In the first position, the first pair of engagement structures are disposed within the first channel and engaged with the first pair of retainer structures. In the second position, the first pair of engagement structures are disposed within the first channel and are engaged with the second pair of engagement structures.

20 Claims, 6 Drawing Sheets

FIG. 10

# CONSOLE STORAGE RETENTION STRUCTURE

FIELD OF THE INVENTION

The present invention relates to the field of vehicle storage consoles, and more particularly, to a vehicle console having a storage retention structure.

BACKGROUND

It is well known to provide consoles in motor vehicles that have storage compartments integrated therein. Such storage consoles are often located in between a front driver's seat and a front passenger's seat of the vehicle, but such consoles may be positioned in various other locations throughout the vehicle. Central to vehicle console design is the requirement that meaningful storage options be provided to the users of the vehicle. In pursuit of this goal, vehicle designers have proposed a vast array of designs for console storage compartments, including console storage compartments that may be reconfigured by the user to suit their specific needs.

Providing a console having a storage compartment that is reconfigurable presents some unique challenges. The reconfigurable elements must be easily repositionable by the user, but, at the same time, must be secured firmly in place. Firm securement of the moveable components ensures that they do not become inadvertently dislodged. Additionally, the presence of squeak and rattle noise within the vehicle should be minimized. Balancing these competing design goals while at the same time providing meaningful storage options for the user has proven difficult, and past designs have met varying degrees of success.

Need remains for improvement in the field of console storage retention structures.

SUMMARY OF THE INVENTION

A console for use in a vehicle having a retention structure according to the invention is taught herein. The console includes a compartment that is defined by a first wall and a second wall that are spaced apart from one another in a first direction. A first channel is disposed adjacent to the first wall and defines an opening oriented in an upward direction. A plurality of retainer structures includes a first pair of laterally spaced-apart retainer structures that are disposed within the first channel and a second pair of laterally spaced-apart retainer structures that are disposed within the first channel. The console further includes a tray member having a plurality of engagement structures that are each configured to engage at least one of the plurality of retainer structures. The plurality of engagement structures of the tray member include a first pair of spaced-apart engagement structures that are configured to be received within the first channel. The tray member is positionable within the compartment in a first position, where the first pair of engagement structures of the tray member are disposed within the first channel and are engaged with the first pair of retainer structures, and in a second position, where the first pair of engagement structures of the tray member are disposed within the first channel and are engaged with the second pair of retainer structures.

The first pair of engagement structures and the first channel may be configured such that engagement of the first pair of engagement structures with the first channel restrains movement of the tray member in the first direction. Furthermore, engagement of the first pair of engagement structures of the tray member with either of the first pair of retainer structures or the second pair of retainer structures may restrain movement of the tray member in a second direction that is perpendicular to the first direction.

The engagement structures of the tray member may engage the retainer structures by a friction fit. Alternatively, the engagement structures of the tray member may engage the retainer structures by a snap fit. As another alternative, each of the plurality of engagement structures may define an opening, and each of the plurality of retainer structures may define a projection that is receivable within at least a portion of at least one of the openings. Conversely, each of the plurality of retainer structures may define an opening, and each of the plurality of engagement structures may define a projection that is receivable within at least a portion of at least one of the openings.

The console may further include a second channel that is disposed adjacent to the second wall, and which defines an opening that is oriented in an upward direction. In this case, the plurality of retainer structures includes a third pair of laterally-spaced apart retainer structures that are disposed within the second channel, and a fourth pair of laterally-spaced apart retainer structures that are disposed within the second channel. Furthermore, the plurality of engagement structures of the tray member may include a second pair of spaced-apart engagement structures that are configured to be received within the second channel. In this configuration, the second pair of spaced-apart engagement structures of the tray member are disposed within the second channel and are engaged with the third pair of retainer structures when the tray member is in the first position, and the second pair of spaced-apart engagement structures of the tray member are disposed within the second channel and are engaged with the fourth pair of retainer structures when the tray member is in the second position.

The compartment may be further defined by a third wall and fourth wall that are spaced apart from one another in a second direction that is perpendicular to the first direction. In this configuration, a first space is defined between the tray member and the third wall along the first channel when the tray member is in the first position, and a second space is defined between the tray member and the fourth wall along the first channel when the tray member is in the second position.

The first channel may be unitarily formed with the first wall.

The first and third pairs of retainer structures may be aligned in the first direction. Similarly, the second and fourth pairs of retainer structures may be aligned in the first direction.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
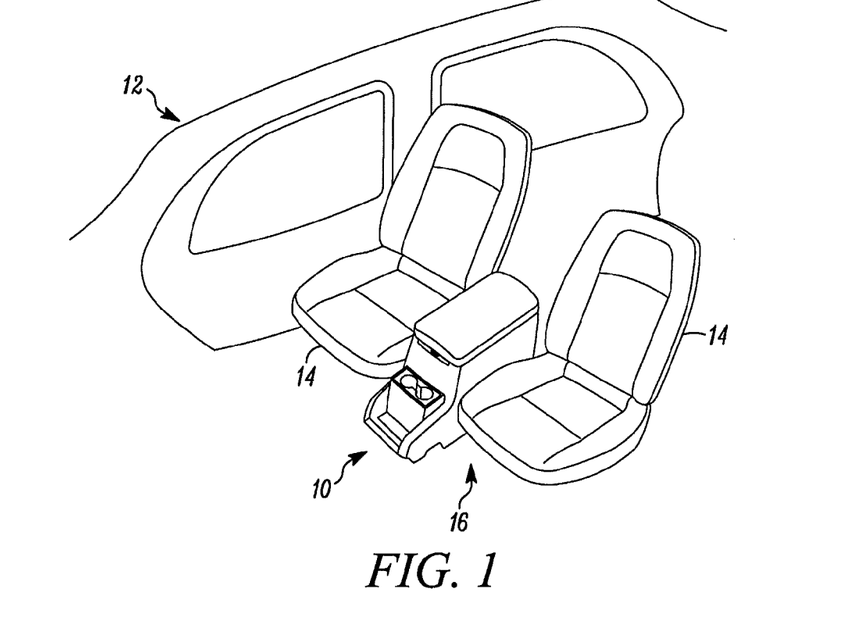
FIG. 1 is a perspective view showing the interior of a vehicle having a console according to the present invention installed therein.

FIG. 1 shows a console 10 according to the invention installed within a vehicle 12. The vehicle 12 includes first and second spaced-apart seats 14 that are disposed within a passenger compartment 16 of the vehicle 12. The console 10 is located in between the seats 14 within the passenger compartment 16 of the vehicle 12.

Figure 2:
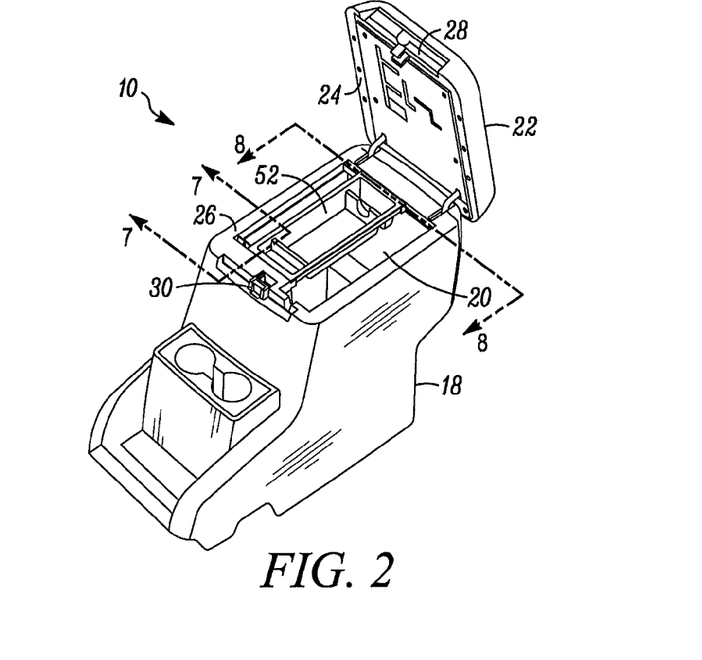
FIG. 2 is a perspective view showing the console in an open position, wherein a tray member is disposed within a compartment that is defined within the console.

As shown in FIG. 2, the console 10 includes a body portion 18 having a compartment 20 defined therein and a lid 22 that is pivotally-mounted to the body portion 18 of the console 10. In particular, the lid 22 is moveable with respect to the body portion 18 of the console 10 between a closed position, wherein an underside 24 of the lid 22 is engaged with a surface 26 that extends around the periphery of the compartment 20, and an open position, wherein the lid 22 is pivoted away from the compartment 20 of the console 10, to allow access to the interior of the compartment 20. A latch 28 may be provided on the lid 22 for engagement with a striker 30 that is provided on the body portion 18 for securing the lid 22 with respect to the body portion 18 of the console 10 when the lid 22 is in the closed position.

Figure 3:
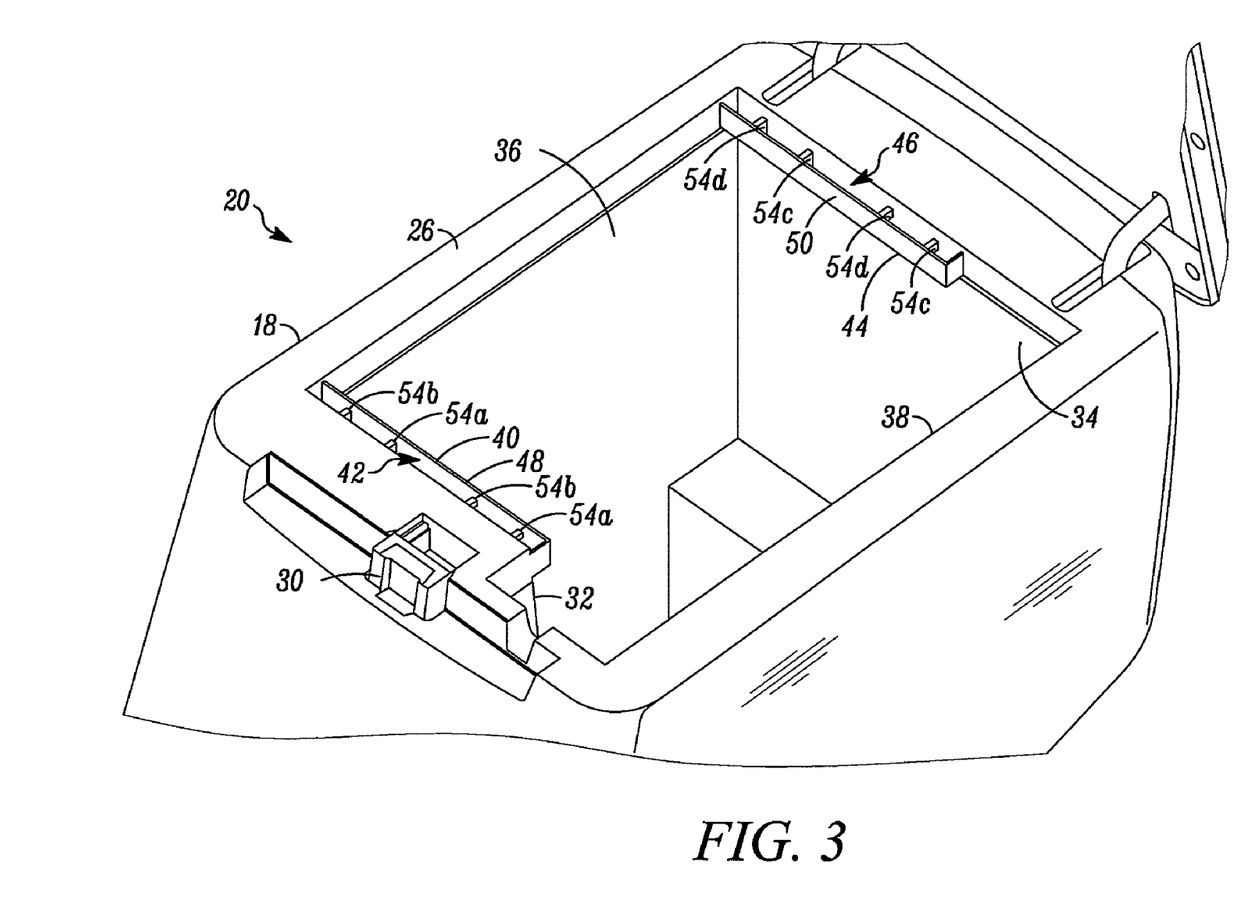
FIG. 3 is a perspective view showing the compartment that is defined within the console.

As best seen in FIG. 3, the compartment 20 is defined by a first wall 32, a second wall 34, a third wall 36, and a fourth wall 38, all of which are portions of the body portion 18 of the console 10. The first wall 32 and the second wall 34 are spaced apart from one another in a first or longitudinal (e.g., fore-to-aft in a vehicle) direction. The third wall 38 and the fourth wall 40 are spaced apart from one another in a second or lateral (e.g., cross-car in a vehicle) direction that is substantially perpendicular to the longitudinal direction.

A first channel 40 is disposed adjacent to the first wall 32 and includes an opening 40 that is oriented in an upward direction. A second channel 44 is disposed adjacent to the second wall 34 and includes an opening 46 that is oriented in an upward direction. The first channel 40 and the second channel 44 may be elongate structures that extend along the first wall 32 and the second wall 34, respectively (e.g., along at least a majority of the first wall 32 and the second wall 34, respectively, as shown in FIG. 3). In particular, the first channel 40 is defined in part by an elongate wall 48 that is positioned opposite the first wall 32 of the compartment 20. Similarly, the second channel 44 is defined in part by an elongate wall 50 that is opposite the second wall 34 of the compartment 20. Furthermore, the first channel 40 and the second channel 44 may each define a substantially U-shaped cross-section having either rectilinear, curvilinear, or substantially arcuate sides including the elongate walls 48, 50, respectively. Additionally, the first channel 40 and the second channel 44 may be formed unitarily with the first wall 32 and the second wall 34, respectively. For example, the first channel 40, the second channel 44, the first wall 32, and/or the second wall 34 may be formed as a single component during a molding process.

The first channel 40 and the second channel 44 are configured and spaced with respect to one another such that they may cooperate to support hanging file folders of a conventional type. While the entire width of the first channel 40 and the second channel 44 could be used for this purpose, alternatively, a portion of the width of the first channel 40 and the second channel 44 could be utilized to support the hanging file folders while the remainder of the width of the first channel 40 and the second channel 44 could be utilized to support a removable tray member 52 having a width that is less than the width of the first channel 40 and the second channel 44.

The tray member 52 is supported within the compartment 20 of the console 10 by the first channel 40 and the second channel 44. As will be explained in detail herein, a plurality of retainer structures 54 are provided within the first channel 40 and the second channel 44 to secure the tray member 52 with respect to the body portion 18 of the console 20. In particular, the plurality of retainer structures 54 includes a first pair of retainer structures 54a and a second pair of retainer structures 54b, both of which are disposed within the first channel 40. Similarly, the plurality of retainer structures 54 includes a third pair of retainer structures 54c and a fourth pair of retainer structures 54d, both of which are disposed within the second channel 44.

The individual retainer structures 54 that make up each pair of retainer structures 54a through 54d are laterally-spaced apart from one another. In particular, the individual retainer structures 54 that make up each pair of retainer structures 54a through 54d are spaced apart by a width that is slightly less than the width of the tray member 52. Furthermore, the first pair of retainer structures 54a and the second pair of retainer structures 54b are positioned in an overlapping configuration, such that a single retainer structure of the first pair of retainer structures 54a is positioned between the second pair of retainer structures 54b and a single one of the second pair of retainer structures 54b is positioned between the first pair of retainer structures 54a. The third pair of retainer structures 54c and the fourth pair of retainer structures 54d are positioned in a similar, staggered manner within the fourth channel 44, such that the first pair of retainer structures 54a and the third pair of retainer structures 54c are aligned with respect to each other in the first or longitudinal direction, while the second pair of retainer structures 54b and the fourth pair of retainer structures 54d are aligned with respect to each other in the first or longitudinal direction.

Figure 4:
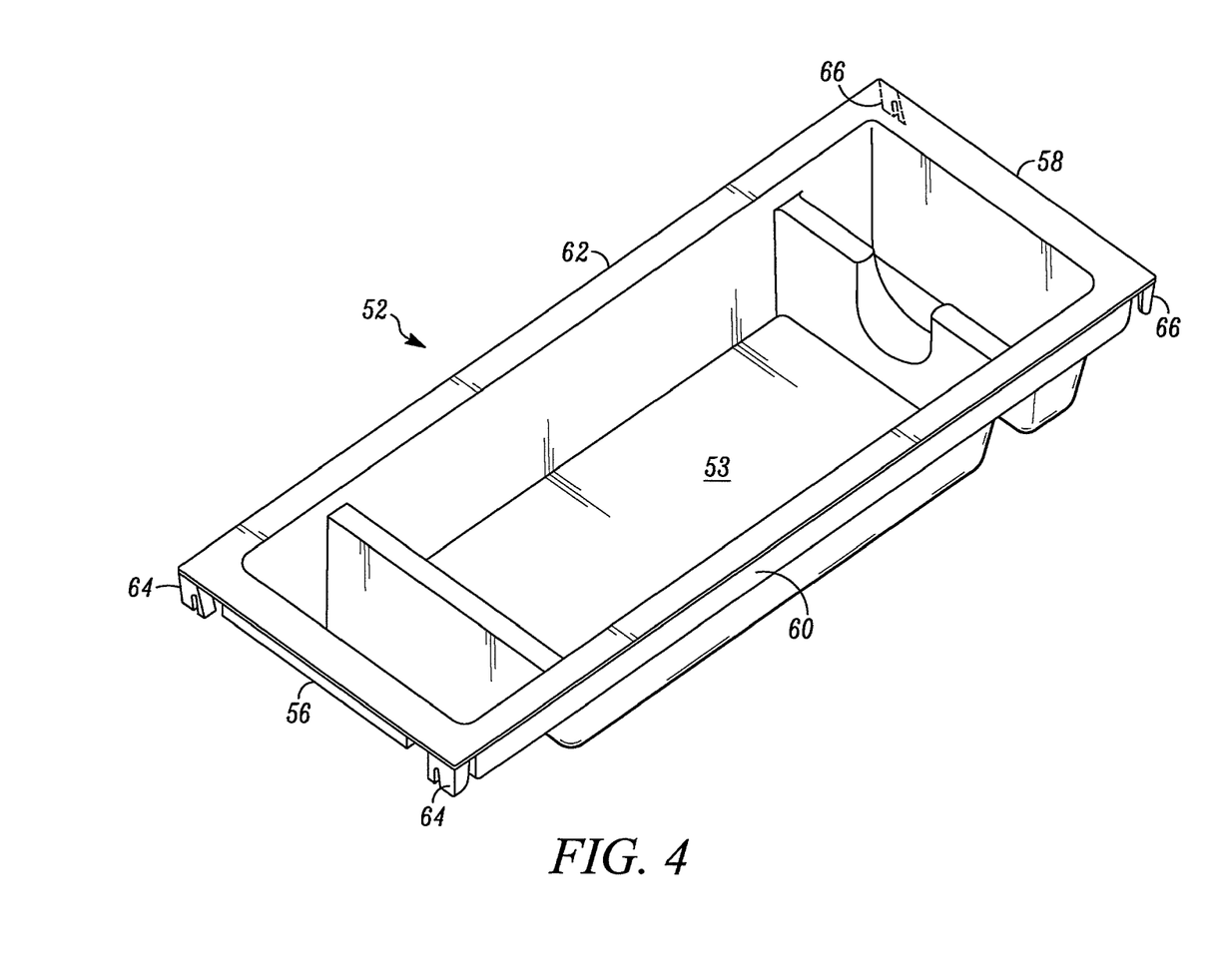
FIG. 4 is a perspective view showing the tray member.

As shown in FIG. 4, the tray member 52 is a unitary body that extends from a first end 56 to a second end 58 in the first or longitudinal direction and extends between a first side 60 and a second side 62 in the second or lateral direction. The tray member 52 defines one or more upwardly-facing storage areas 53 for holding various articles, as desired by a user.

In order to support the tray member 52 with respect to the first channel 40 and the second channel 44 of the console 10, a first pair of engagement structures 64 is positioned at the first end 56 of the tray member 52, and a second pair of engagement structures 66 is positioned at the second end 58 of the tray member 52. The first pair of engagement structures 64 is spaced apart in the second or lateral direction such that each is adjacent to a respective one of the first side 60 and the second side 62 of the tray member 52. The second pair of engagement structures 66 are likewise spaced-apart in the lateral direction such that each is adjacent to a respective one of the first side 60 and the second side 62 of the tray member 52. As will be explained in detail herein, the first pair of engagement structures 64 is configured to be received within the first channel 40, while the second pair of engagement structures 66 is configured to be received within the second channel 44. Furthermore, the first pair of engagement structures 64 are selectively engageable with either the first pair of retainer structures 54a or the second pair of retainer structures 54b. Similarly, the second pair of engagement structures are selectively engageable with the third pair of retainer structures 54c or the fourth pair of retainer structures 54d.

Figure 5:
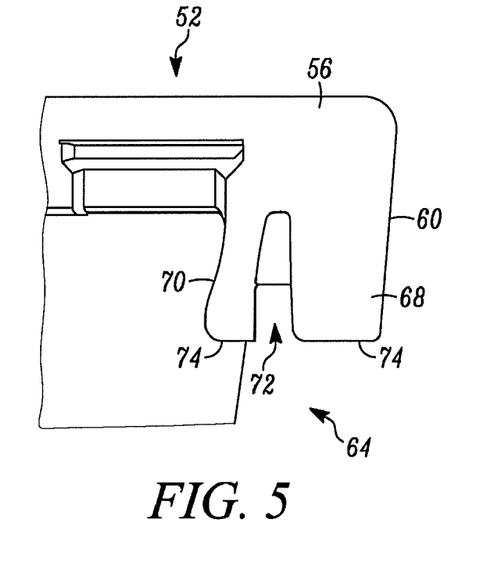
FIG. 5 is a front profile detail showing an engagement structure of the tray member.

FIG. 5 shows one of the engagement structures of the first pair of engagement structures 64 as representative of both the first pair of engagement structures and the second pair of engagement structures 66. The engagement structure 64 is located at the first end 56 of the tray member 52 adjacent to the first side 60 of the tray member 52. More particularly, the engagement structure 64 includes an outer portion 68 that is disposed directly adjacent to the first side 60 of the tray member, and an inner portion 70 that is disposed inward of the outer portion 68 and spaced therefrom by a slot 72. Provision of the slot 72 between the outer portion 68 and the inner portion 70 of the engagement structure 64 allows the inner portion 70 of the engagement structure 64 to deflect outward toward the outer portion 68, as will be explained further herein. On both of the outer portion 68 and the inner portion 70, bottom surfaces 74 are provided for engagement with the bottom of the first channel 40 when the engagement structure 64 is disposed within the first channel 40.

Figure 6:
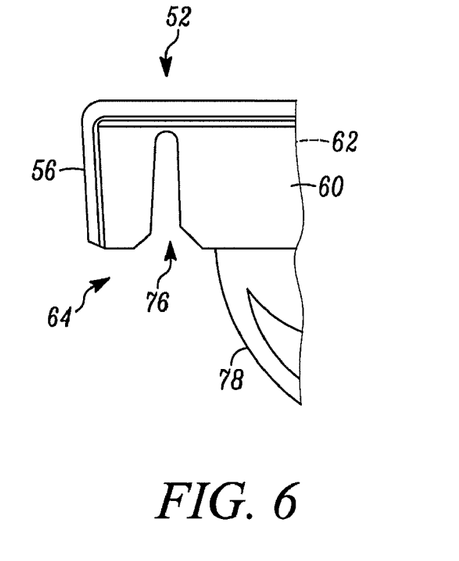
FIG. 6 is a side profile detail showing an engagement structure of the tray member.
Figure 7:
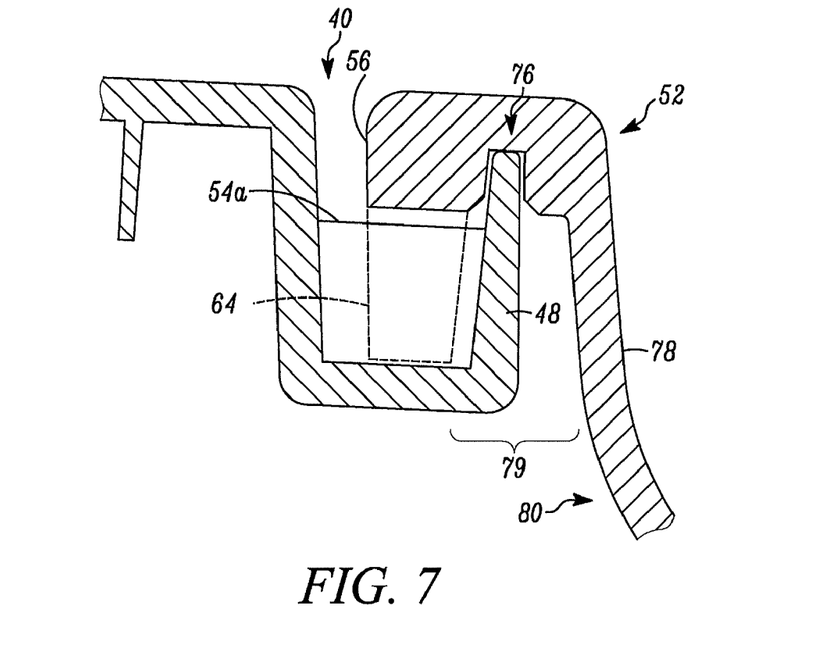
FIG. 7 is a front, cross-sectional view showing engagement of the tray member with a channel that is defined within the compartment of the console.

As shown in FIG. 6, slots 76 are defined through the first side 60 and second side 62 of the tray member 52. The slots 76 are downwardly facing and are disposed between both the first pair of engagement structures 64, as well as the second pair of engagement structures 66 (not shown in FIG. 6), and a wall 78 that at least partially defines the storage areas 53 of the tray member 52. The slots 76 extend across the tray member 52 in the second, lateral direction. The elongate walls 48, 50 of the first channel 40 and the second channel 44, respectively, are receivable within the slots 76 to further support and retain the tray member 52 with respect to the compartment 20 of the console 10. As shown in FIG. 7, the slots 76 that are defined through the first side 60 and the second side 62 of the tray member 52 may be aligned with or integrally-formed with a downwardly-facing groove 79 that is provided on an underside 80 of the tray member 52 at each of the first end 56 and the second end 58 thereof. As with the slots 76, the elongate walls 48, 50 of the first channel 40 and the second channel 44, respectively, are receivable within the downwardly facing groove 79. It should be apparent that engagement of any of the engagement structures 64, 66, the slots 76 and/or the grooves 79 with respective portions of the first channel 40 and the second channel 44 is operable to restrain movement of the tray member 52 with respect to the console 10 in the first or longitudinal direction.

Figure 8:
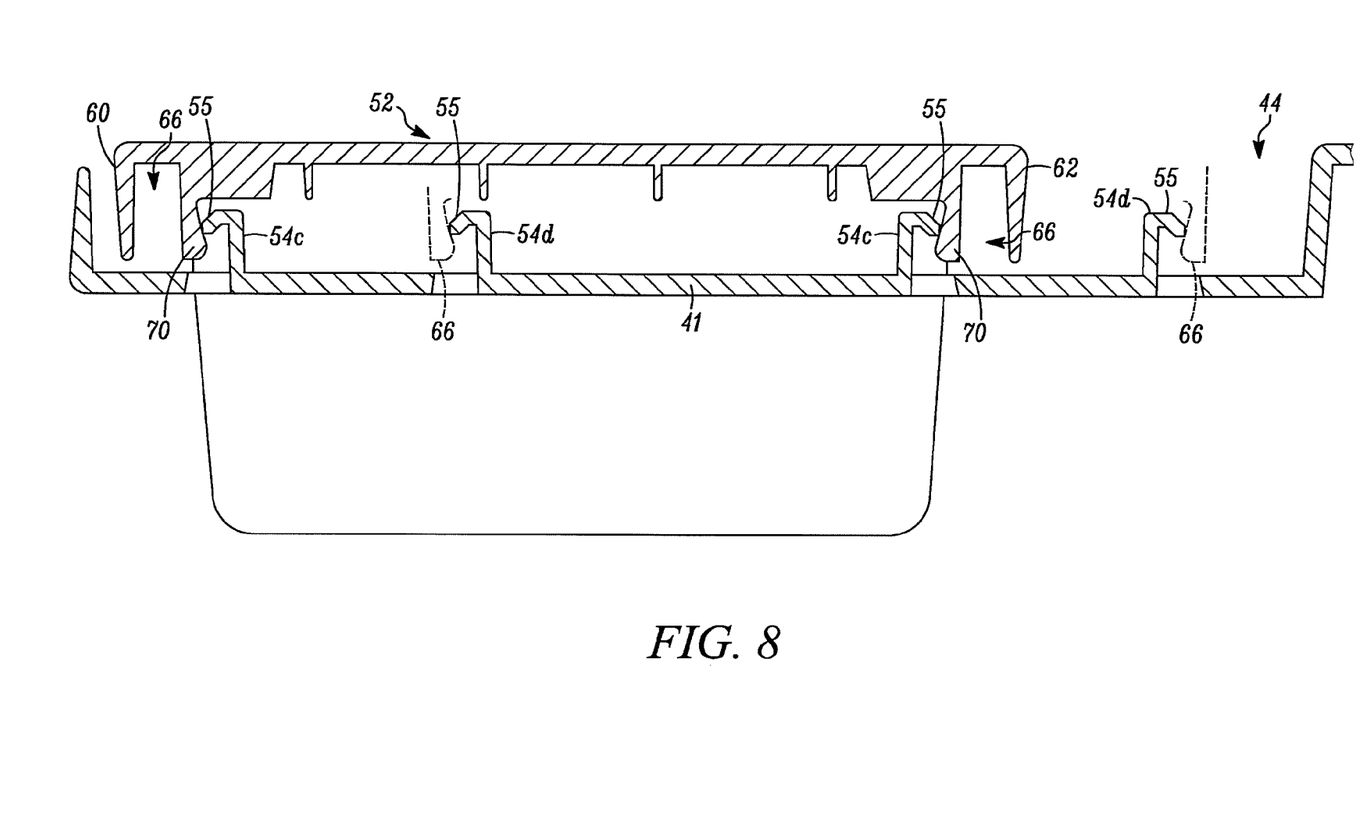
FIG. 8 is a side, cross-sectional view showing engagement of the tray member with the second channel of the compartment in the console.

Engagement of the tray member 52 with the first channel 40 and the second channel 44 will be further understood with reference to FIG. 8, which shows the second pair of engagement structures 66 of the tray member 52 disposed within the second channel 44 and in engagement with the third pair of retainer structures 54c. The retainer structures 54c, 54d extend upward from a bottom wall 41 of the second channel 44 for engagement with the second pair of engagement structures 66 of the tray member 52. Through engagement of the engagement structures 64, 66 with the retainer structures 54a-54d, movement of the tray member 52 with respect to the console 10 is restrained in the second or lateral direction.

In the illustrated embodiment, the third and fourth pairs of retainer structures 54c, 54d are substantially J-shaped members having hooked portions 55 opposite the bottom wall 41 of the second channel 44. Since the third and fourth pairs of retainer structures 54c, 54d are formed integrally with the second channel 44 from a plastic material, the third and fourth pairs of retainer structures 54c, 54d exhibit some resiliency at their hook-shaped portions 55. This, coupled with the fact that the inner portions 70 of the second pair of engagement structures 66 also exhibit some resiliency, serves to define a snap-fit engagement between the second pair of retainer structures 66 and any of the third pair of retainer structures 54c and the fourth pair of retainer structures 54d (shown in phantom in FIG. 8). Alternatively, it will be readily understood that a friction fit could be defined between the engagement structures 64, 66 and the retainer structures 54a-54d, for example, by providing either of the engagement structures 64, 66 or the retainer structures 54a-54d in the form of openings, while providing the other of the engagement structures 64, 66 and the retainer structures 54a-54d in the form of projections that are dimensioned to be received within the openings by a friction fit.

Figure 9:
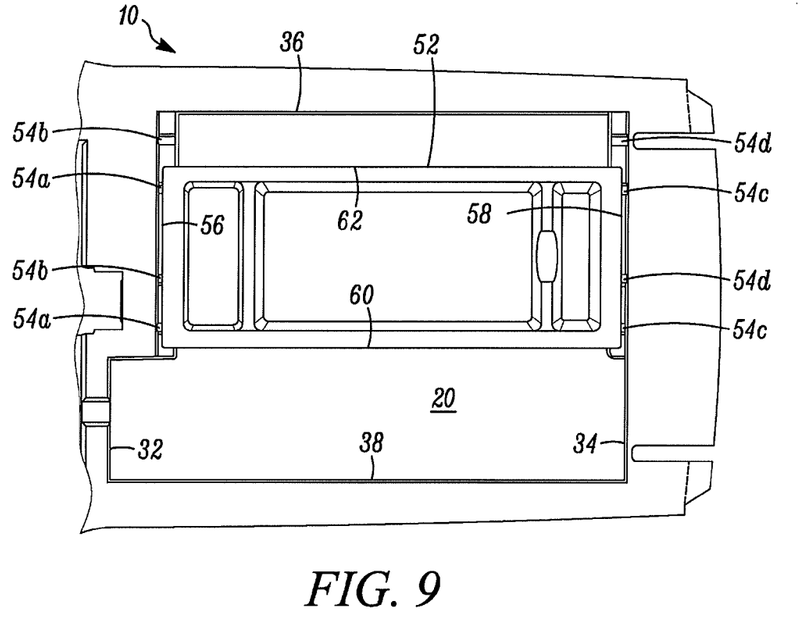
FIG. 9 is a plan view showing a tray member disposed in a first position within the compartment of the console.
Figure 10:
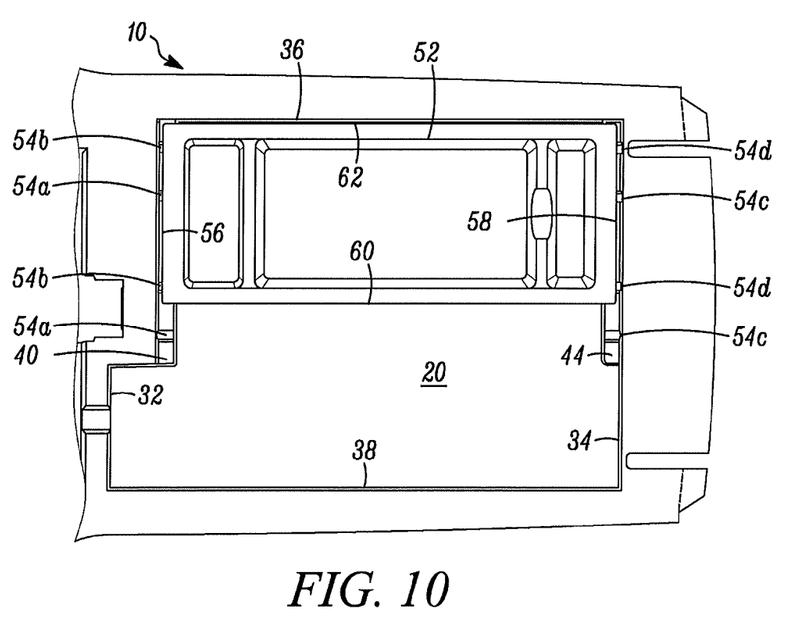
FIG. 10 is a plan view showing the tray member disposed in a second position within the compartment of the console.

As can be appreciated from the foregoing, the tray member 52 is positionable within the compartment 20 of the console 10 in a first position, as shown in FIG. 9, and a second position, as shown in FIG. 10. In the first position, the first pair of engagement structures 64 of the tray member 52 are disposed within the first channel 40 and are engaged with the first pair of retainer structures 54a. Similarly, the second pair of engagement structures 66 of the tray member 52 are disposed within the second channel 54 and are engaged with the third pair of retainer structures 54c when the tray member 52 is in the first position. In this manner, a space is defined between the second side 62 of the tray member 52 and the third wall 36 along the first channel 40 and the second channel 44. This defines a first storage area in which hanging files may be stored between the third wall 36 and the tray member 52 when the tray member 52 is disposed within the compartment 20 and in the first position.

In the second position, the first pair of engagement structures 64 of the tray member 52 is disposed within the first channel 40 and is engaged with the second pair of retainer structures 54b. Similarly, the second pair of engagement structures 66 of the tray member 52 are disposed within the second channel 44 and are engaged with the fourth pair of retainer structures 54d such that a second space is defined between the first side 60 of the tray member 52 and the fourth wall 38 along the first channel 40 and the second channel 44. This provides a second storage area for hanging files within the compartment 20 when the tray member 52 is disposed in the second position within the compartment 20 of the console 10.

Herein, the engagement structures 64, 66, the slots 76 and/or the grooves 79 are described as cooperating with respective portions of the first channel 40 and the second channel 44 to restrain movement of the tray member 52 with respect to the console 10 in the first or longitudinal direction, while the engagement structures 64, 66 are described as cooperating with the retainer structures 54a-54d to restrain movement of the tray member 52 with respect to the console 10 in the second or lateral direction. However, it should be understood that any of these elements could be reoriented to provide restraint in any desired direction. For example, the engagement structures 64, 66 and the retainer structures 54a-54d could be rotated 90 degrees such that they cooperate to restrain movement of the tray member 52 with respect to the console 10 in the first or longitudinal direction.

In use, a user may install the tray member 52 within the compartment 20 of the console 10 of the vehicle 12 in the first position or the second position. Alternatively, the user could remove the tray member 52 from the compartment 20 of the console 10 and then utilize the compartment 20 without the tray member 52.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A console for use in a vehicle, the console comprising:
a compartment defined by a first wall and a second wall that are spaced apart from one another in a first direction;
a first channel disposed adjacent to the first wall, the first channel defining an opening oriented in an upward direction;
a plurality of retainer structures including a first pair of laterally spaced apart retainer structures that are disposed within the first channel and a second pair of laterally spaced apart retainer structures that are disposed within the first channel;
a tray member having a plurality of engagement structures that are each configured to engage at least one of the plurality of retainer structures; and
the plurality of engagement structures of the tray member including a first pair of spaced apart engagement structures that are configured to be received within the first channel,
wherein the tray member is positionable within the compartment in a first position where the first pair of engagement structures of the tray member are disposed within the first channel and are engaged with the first pair of retainer structures, and in a second position where the first pair of engagement structures of the tray member are disposed within the first channel and are engaged with the second pair of retainer structures.

2. The console of claim 1, wherein engagement of the first pair of engagement structures of the tray member with the first channel restrains movement of the tray member in the first direction.

3. The console of claim 1, wherein engagement of the first pair of engagement structures of the tray member with either the first pair of retainer structures or the second pair of retainer structures restrains movement of the tray member in a second direction that is perpendicular to the first direction.

4. The console of claim 1, wherein the engagement structures of the tray member engage the retainer structures by a friction fit.

5. The console of claim 1, wherein the engagement structures of the tray member engage the retainer structures by a snap fit.

6. The console of claim 1, wherein each of the plurality of engagement structures defines an opening and each of the plurality of retainer structures defines a projection that is receivable within at least a portion of at least one of the openings.

7. The console of claim 1, wherein each of the plurality of retainer structures defines an opening and each of the plurality of engagement structures defines a projection that is receivable within at least a portion of at least one of the openings.

8. The console of claim 1, further comprising:
a second channel disposed adjacent to the second wall, the second channel defining an opening oriented in an upward direction;
the plurality of retainer structures including a third pair of laterally spaced apart retainer structures that are disposed within the second channel and a fourth pair of laterally spaced apart retainer structures that are disposed within the second channel; and
the plurality of engagement structures of the tray member including a second pair of spaced apart engagement structures that are configured to be received within the second channel; and
wherein the second pair of spaced apart engagement structures of the tray member are disposed within the second channel and are engaged with the third pair of retainer structures when the tray member is in the first position, and wherein the second pair of spaced apart engagement structures of the tray member are disposed within the second channel and are engaged with the fourth pair of retainer structures when the tray member is in the second position.

9. The console of claim 1, wherein the compartment is further defined by a third wall and a fourth wall that are spaced apart from one another in a second direction that is perpendicular to the first direction, wherein a first space is defined between the tray member and the third wall along the first channel when the tray member is in the first position, and wherein a second space is defined between the tray member and the fourth wall along the first channel when the tray member is in the second position.

10. The console of claim 1, wherein the first channel is unitarily formed with the first wall.

11. The console of claim 8, wherein the first and third pairs of retainer structures are aligned in the first direction, and wherein the second and fourth pairs of retainer structures are aligned in the first direction.

12. A console for use in a vehicle, the console comprising:
a compartment defined by a first wall and a second wall that are spaced apart from one another in a first direction and by a third wall and a fourth wall that are spaced apart from one another in a second direction that is perpendicular to the first direction;
a first channel disposed adjacent to the first wall, the first channel defining an opening oriented in an upward direction;
a second channel disposed adjacent to the second wall, the second channel defining an opening oriented in an upward direction;
a plurality of retainer structures including a first pair of laterally spaced apart retainer structures that are disposed within the first channel, a second pair of laterally spaced apart retainer structures that are disposed within the first channel, a third pair of laterally spaced apart retainer structures that are disposed within the second channel and a fourth pair of laterally spaced apart retainer structures that are disposed within the second channel;
a tray member having a plurality of engagement structures that are each configured to engage at least one of the plurality of retainer structures; and
the plurality of engagement structures of the tray member including a first pair of spaced apart engagement structures that are configured to be received within the first channel and a second pair of spaced apart engagement structures that are configured to be received within the second channel,
wherein the tray member is positionable within the compartment in a first position where the first pair of engagement structures of the tray member are disposed within the first channel and are engaged with the first pair of retainer structures and the second pair of spaced apart engagement structures of the tray member are disposed within the second channel and are engaged with the third pair of retainer structures such that a first space is defined between the tray member and the third wall along the first and second channels, and in a second position where the first pair of engagement structures of the tray member are disposed within the first channel and are engaged with the second pair of retainer structures and the second pair of spaced apart engagement structures of the tray member are disposed within the second channel and are engaged with the fourth pair of retainer structures such that a second space is defined between the tray member and the fourth wall along the first and second channels.

13. The console of claim 12, wherein engagement of the first pair of engagement structures of the tray member with the first channel and engagement of the second pair of engagement structures of the tray member with the second channel restrains movement of the tray member in the first direction.

14. The console of claim 12, wherein engagement of the first pair of engagement structures of the tray member with either the first pair of retainer structures or the second pair of retainer structures and engagement of the second pair of engagement structures of the tray member with either the third pair of retainer structures or the fourth pair of retainer structures restrains movement of the tray member in the second direction.

15. The console of claim 12, wherein the engagement structures of the tray member engage the retainer structures by a friction fit.

16. The console of claim 12, wherein the engagement structures of the tray member engage the retainer structures by a snap fit.

17. The console of claim 12, wherein each of the plurality of engagement structures defines an opening and each of the plurality of retainer structures defines a projection that is receivable within at least a portion of at least one of the openings.

18. The console of claim 12, wherein each of the plurality of retainer structures defines an opening and each of the plurality of engagement structures defines a projection that is receivable within at least a portion of at least one of the openings.

19. The console of claim 12, wherein the first channel is unitarily formed with the first wall and the second channel is unitarily formed with the second wall.

20. The console of claim 12, wherein the first and third pairs of retainer structures are aligned in the first direction and the second and fourth pairs of retainer structures are aligned in the first direction.

\* \* \* \* \*